S. A. ROBERTS.
LINE SUPPORT.
APPLICATION FILED OCT. 15, 1910.
1,000,756.
Patented Aug. 15, 1911.
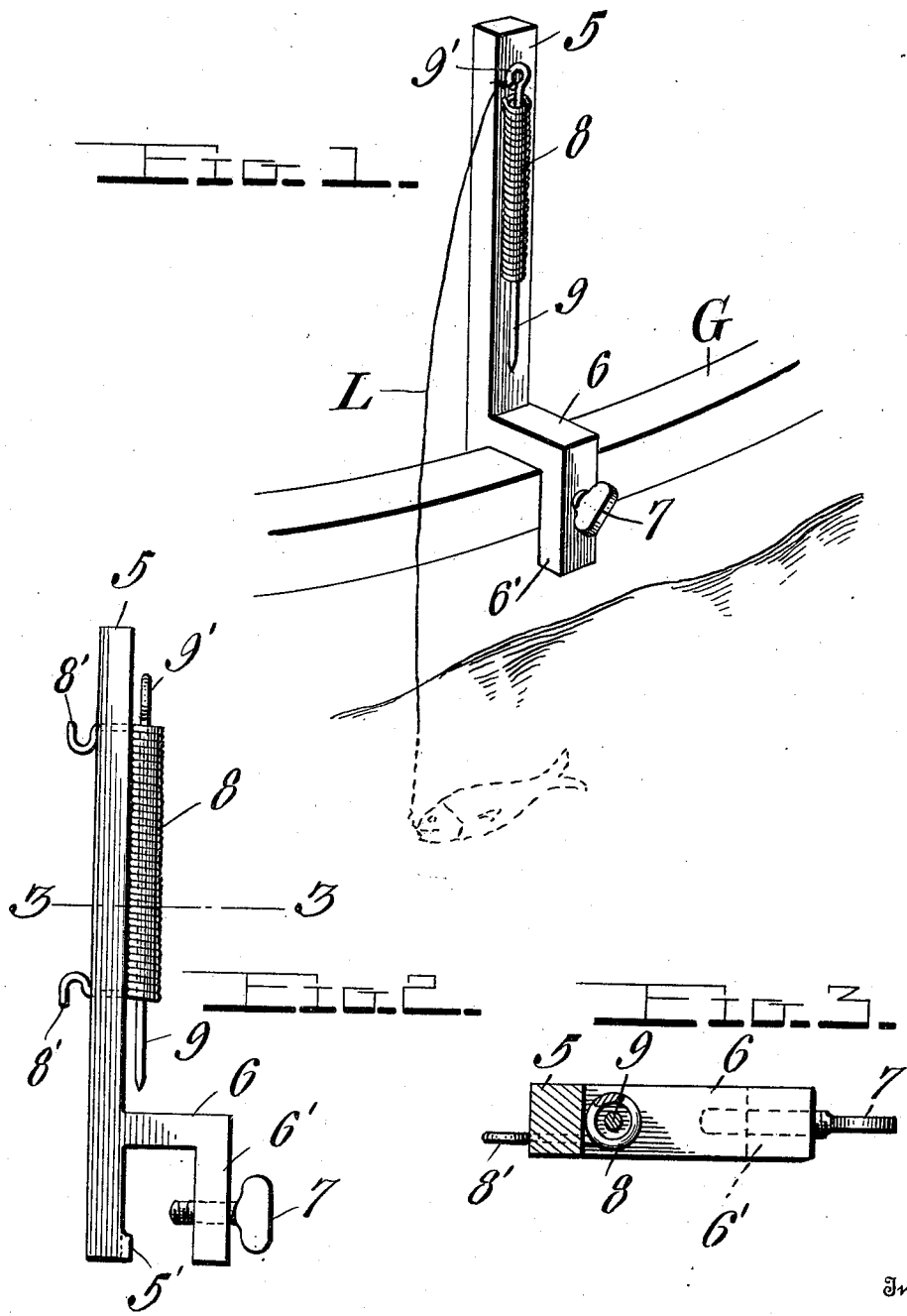

UNITED STATES PATENT OFFICE.

SIMEON A. ROBERTS, OF HAMBURG, ARKANSAS.

LINE-SUPPORT.

1,000,756.  Specification of Letters Patent.  Patented Aug. 15, 1911.

Application filed October 15, 1910. Serial No. 587,226.

*To all whom it may concern:*

Be it known that I, SIMEON A. ROBERTS, a citizen of the United States, residing at Hamburg, in the county of Ashley and State of Arkansas, have invented certain new and useful Improvements in Line-Supports, of which the following is a specification, reference being had to the accompanying drawings.

This invention relates to improvements in line holders and more particularly to a new and novel device for holding fish lines to allow fish which have been caught to remain in the water.

A further object of the invention is to provide a supporting bar having a U-shaped end to engage over the gunwale of a boat and means for fastening the same thereto, and a coiled wire guide secured to the supporting bar to receive a rod to which the fish line is attached.

Another object of the invention is to provide an extremely simple and efficient device of the above character which may be permanently secured to the boat and will permit of the easy and quick removal of the line.

With these and other objects in view, the invention consists of the novel features of construction and the combination and arrangement of parts hereinafter fully described and claimed, and illustrated in the accompanying drawings, in which—

Figure 1 is a perspective view of a fish line support constructed in accordance with my invention illustrating the same secured to a boat; Fig. 2 is a side elevation; and Fig. 3 is a section taken on the line 3—3 of Fig. 2.

Referring more particularly to the drawings G designates the gunwale of a boat or other base upon which my improved line support is adapted to be arranged.

The supporting device consists of a vertical rectangular bar 5 which has integrally formed therewith at one end a lateral extension 6. This extension is of substantially L-shaped form and has its vertical leg 6′ extended in parallel relation to the bar 5. A set screw 7 is threaded through the leg 6′ for binding engagement upon the gunwale G whereby the line support may be rigidly and removably secured thereto. The inner face of the lower end of the bar 5 is preferably formed with a projection 5′ so that it will bite into the side of the boat and prevent any possibility of the device moving longitudinally thereon. On one side of the bar 5 a guide member 8 is arranged. This guide member is in the form of a coiled wire which may be of any preferred length and has its ends extended through the bar 5 and the extremities thereof are formed with oppositely disposed hooks 8′. A rod 9 is adapted to be extended through the coils of the wire guide 8 and has formed upon one end an eye 9′ to which the fish line L is secured. The eye 9′ engages the upper coil of the wire guide 8 and limits the downward movement of said rod.

In the use of the device the same is arranged upon the gunwale of a boat or other supporting base, and the fish as they are caught are attached to one end of the line L in the usual manner. The rod 9 has attached thereto the other end of the line L and is inserted through the coils of the guide 8. The fish are then placed back in the water so that they may be kept fresh until the user has caught a sufficient supply. The line L may be drawn up and wrapped upon the hooked ends 8′ of the wire 8 to prevent the same being tangled when the fisher moves from place to place. The rod 9 is then removed from the guide 8 and provides a very convenient handle by means of which the fish may be carried.

From the foregoing it is believed that the construction and manner of use of my improved line support will be readily understood.

The device is extremely simple, may be manufactured at a very low cost and can be easily and quickly attached to or detached from the boat or other base.

Having thus described the invention what is claimed is:

A device of the character described comprising a supporting bar, a lateral extension formed on said bar adjacent to one end and angularly disposed in parallel relation to the end of the bar, said extension being adapted for engagement upon the gunwale of a boat, a clamping screw carried by said extension to rigidly secure the bar in a vertical position, a wire closely coiled upon itself to form a continuous wire tube, said tube being disposed vertically upon one side of the bar and having its ends extended through said bar to support and strengthen the coil, the extremities of said wire end portions being bent in opposite directions to form hooks on the opposite side of the bar to that upon which the coil is located, in combination with a line carrying rod adapted to be removably disposed through the coils of the wire and having an eye formed upon one end to which the line is attached, said eye being of greater diameter than the wire coils for engagement upon the upper end thereof In testimony whereof I hereunto affix my signature in the presence of two witnesses.

SIMEON A. ROBERTS.

Witnesses:
W. P. Sawyer,
F. C. Sawyer.

Copies of this patent may be obtained for five cents each, by addressing the "Commissioner of Patents, Washington, D. C."